United States Patent
Georgi et al.

(10) Patent No.: US 9,487,995 B2
(45) Date of Patent: Nov. 8, 2016

(54) WINDOW COVERING SIZING METHOD AND APPARATUS

(71) Applicant: Newell Window Furnishings, Inc., High Point, NC (US)

(72) Inventors: Kristi Jane Georgi, Dunwoody, GA (US); Brian Bellamy Johnson, Atlanta, GA (US); James McCauley, Roswell, GA (US); Martin Richard Van Buren, Atlanta, GA (US)

(73) Assignee: Hunter Douglas Industries Switzerland GmbH, Luzern (CH)

( * ) Notice: Subject to any disclaimer, the term of this patent is extended or adjusted under 35 U.S.C. 154(b) by 0 days.

(21) Appl. No.: 14/467,600

(22) Filed: Aug. 25, 2014

(65) Prior Publication Data

US 2014/0360328 A1    Dec. 11, 2014

Related U.S. Application Data

(62) Division of application No. 12/839,092, filed on Jul. 19, 2010, now Pat. No. 8,844,414.

(51) Int. Cl.
*B26D 1/157* (2006.01)
*E06B 9/266* (2006.01)
(Continued)

(52) U.S. Cl.
CPC ............. *E06B 9/266* (2013.01); *B23D 45/003* (2013.01); *B23D 59/001* (2013.01); *E06B 9/24* (2013.01); *Y10T 83/04* (2015.04); *Y10T 83/0405* (2015.04); *Y10T 83/0605* (2015.04); (Continued)

(58) Field of Classification Search
CPC ... B23D 45/003; B23D 59/001; E06B 9/266; E06B 9/24; E06B 9/26; Y10T 83/04; Y10T 83/0405; Y10T 83/0605; Y10T 83/141; Y10T 83/445; Y10T 83/515; Y10T 83/162; Y10T 83/159
USPC ...................... 83/72, 76, 206, 207, 440, 466
See application file for complete search history.

(56) References Cited

U.S. PATENT DOCUMENTS 6,412,381 B1    7/2002    Wang et al.
6,640,855 B2   11/2003    Giles
(Continued)

FOREIGN PATENT DOCUMENTS

CA          2296863 A1    1/2000
WO     2009036248 A2    3/2009

OTHER PUBLICATIONS

United States Patent and Trademark Office, U.S. Appl. No. 10/908,728, Restriction Requirement, Jul. 9, 2007.
(Continued)

*Primary Examiner* — Omar Flores Sanchez
(74) *Attorney, Agent, or Firm* — Dority & Manning, P.A.

(57) ABSTRACT

An apparatus for cutting a window covering comprises a saw blade for cutting a plurality of different types of window coverings. A first controllable drive moves the saw blade into engagement with a window covering selected from the plurality of different types of the window coverings. A second controllable drive for rotates the saw blade. A preferred saw blade feed rate and a preferred saw blade speed for each of the plurality of different types of window coverings is determined. The first variable drive and the second variable drive are controlled based on the preferred saw blade feed rate and the preferred saw blade speed for the window covering being cut.

14 Claims, 8 Drawing Sheets

(51) Int. Cl.
*B23D 45/00* (2006.01)
*B23D 59/00* (2006.01)
*E06B 9/24* (2006.01)

(52) U.S. Cl.
CPC ............ *Y10T 83/141* (2015.04); *Y10T 83/159* (2015.04); *Y10T 83/162* (2015.04); *Y10T 83/445* (2015.04); *Y10T 83/515* (2015.04)

(56) References Cited

U.S. PATENT DOCUMENTS

| | | | |
|---|---|---|---|
| 6,758,257 | B2 | 7/2004 | Lee |
| 6,793,073 | B2 | 9/2004 | Tu |
| 7,000,516 | B2* | 2/2006 | Lin et al. .................. 83/197 |
| 7,036,412 | B2* | 5/2006 | Abdollahzadeh .............. 83/100 |
| 7,069,832 | B2 | 7/2006 | Roberts et al. |
| 7,118,028 | B2 | 10/2006 | Liu et al. |
| 7,178,439 | B2* | 2/2007 | Gilboy et al. .................. 83/454 |
| 7,987,754 | B2* | 8/2011 | Caputo et al. .................. 83/207 |
| 8,261,644 | B2* | 9/2012 | Caputo et al. .................. 83/206 |
| 8,844,414 | B2 | 9/2014 | Georgi et al. |
| 2002/0005431 | A1 | 1/2002 | Siefert et al. |
| 2003/0155258 | A1 | 8/2003 | Tu |
| 2004/0173079 | A1* | 9/2004 | Caputo et al. .................. 83/694 |
| 2009/0064835 | A1* | 3/2009 | Nien ............................... 83/466 |
| 2011/0061505 | A1 | 3/2011 | Begin et al. |

OTHER PUBLICATIONS

United States Patent and Trademark Office, U.S. Appl. No. 10/908,728, Office Action, Oct. 4, 2007.
United States Patent and Trademark Office, U.S. Appl. No. 10/908,728, Final Office Action, Apr. 30, 2008.
United States Patent and Trademark Office, U.S. Appl. No. 10/908,728, Office Action, Oct. 8, 2008.
United States Patent and Trademark Office, U.S. Appl. No. 10/908,728, Final Office Action, Apr. 23, 2009.
United States Patent and Trademark Office, U.S. Appl. No. 10/908,728, Office Action, Mar. 2, 2011.
United States Patent and Trademark Office, U.S. Appl. No. 12/685,843, Restriction Requirement, Jun. 28, 2010.
United States Patent and Trademark Office, U.S. Appl. No. 12/685,843, Office Action, Aug. 19, 2010.
United States Patent and Trademark Office, U.S. Appl. No. 12/685,843, Final Office Action, Jan. 20, 2011.
Newell Window Furnishings, Inc., Canadian Application No. 2,746,786, Office Action, Jul. 10, 2013.
European Patent Office, Search Report, European Patent Application No. 11005917.7, Nov. 8, 2011.

\* cited by examiner

WINDOW COVERING SIZING METHOD AND APPARATUS

This application is a divisional of U.S. patent application Ser. No. 12/839,092, filed Jul. 19, 2010, now U.S. Pat. No. 8,844,414, the disclosure of the above application is incorporated herein by reference in its entirety.

BACKGROUND

Window coverings come in a variety of materials including wood, plastic, fabric, vinyl and aluminum and a variety of styles. Window coverings are sold as stock, custom and cut-to-size or size-in-store. Stock window coverings are manufactured in a variety of standard widths that are intended to fit corresponding standard window sizes. Custom window coverings are manufactured to specified dimensions per a customer's specific request. Cut-to-size or size-in-store window coverings are manufactured in a limited number of sizes that are intended to be used with a wide range of window sizes. A cutting machine is provided at the retail outlet that cuts the window covering from the manufactured or stock size to a desired size.

SUMMARY

An apparatus for cutting a window covering comprises a saw blade for cutting a plurality of different types of window coverings. A first drive moves the saw blade into engagement with a window covering selected from the plurality of different types of the window coverings. A second drive rotates the saw blade. A storage medium stores a preferred saw blade feed rate and a preferred saw blade speed for each of the plurality of different types of window coverings. A processor controls the first drive and the second drive based on the preferred saw blade feed rate and the preferred saw blade speed for the window covering being cut.

The first and second drives may comprise variable speed motors. The saw blade may comprise a 10 inch, 52 tooth steel-cutting blade. The first drive may move a carriage that supports the second drive. The apparatus may also comprise a second saw blade spaced from the first saw blade. The apparatus may be connected to a network. A sensor may be used for reading a machine readable code associated with a package containing the window covering. A platform may be provided in a cutting chamber where the saw blades are positioned at opposite ends of the platform. The drives may comprise variable speed motors and or variable speed transmissions.

A method of cutting a window covering in a cutting machine of the type having a saw blade comprises identifying a type of window covering; determining a preferred operating parameter of the saw blade for the type of window covering; controlling an actual operating parameter of the saw blade to be equal to the preferred operating parameter; and cutting a window covering using the saw blade. The preferred operating parameter may be saw blade speed or saw blade feed rate. The preferred operating parameter may be stored in memory. The step of controlling may comprise controlling a variable speed drive. The method may further comprise selecting one type of window covering from a plurality of different types of window coverings. A code corresponding to the one type of window covering may be obtained from a bar code where the bar code may be applied to packaging for the window covering. The window covering may be packaged in a package such that the ends of the window covering are exposed. The exposed ends may be clamped prior to cutting. Compressible inserts may place in the package prior to clamping the exposed ends.

DESCRIPTION OF EMBODIMENTS OF THE INVENTION

In this application the terms "size-in-store" and "cut-to-size" refer to window coverings that are manufactured in a limited number of predetermined stock widths and that may be cut to a desired size using a window covering cutting machine. The window covering is purposely manufactured in a size that is wider than the window or other architectural feature with which the window covering is intended to be used. It will be appreciated that cut-to-size window coverings may come in a limited number of different stock widths where each width is intended to be used with a range of window widths. Whether a single stock width is provided or several stock widths are provided, the significant feature of these window coverings is that they are provided in stock sizes that are cut to the desired size at the retail level and are not sized for use with a articular window size during the manufacturing process. The window coverings are typically cut to the specific size desired by the end user at the point of sale using a cutting machine provided by the window covering manufacturer.

The size-in-store (SIS) machine uses controllable variable speed drives to control the operation of saws such that the system is capable of cutting a wide variety of materials including wood, plastic, fabric, vinyl and aluminum and a wide variety of styles including horizontal blinds, vertical blinds, woven shades, pleated shades, Roman shades and cellular blinds. The system can also cut the shade panel, head rail and bottom rail in one pass of the saw. The rotational speed of the saw blade and the feed rate of the saw blade are controlled on a per cut basis based on the type of window covering loaded into the SIS machine. The SIS machine is capable of cutting a wide variety of materials and window covering styles with a high quality cut.

Figure 1:
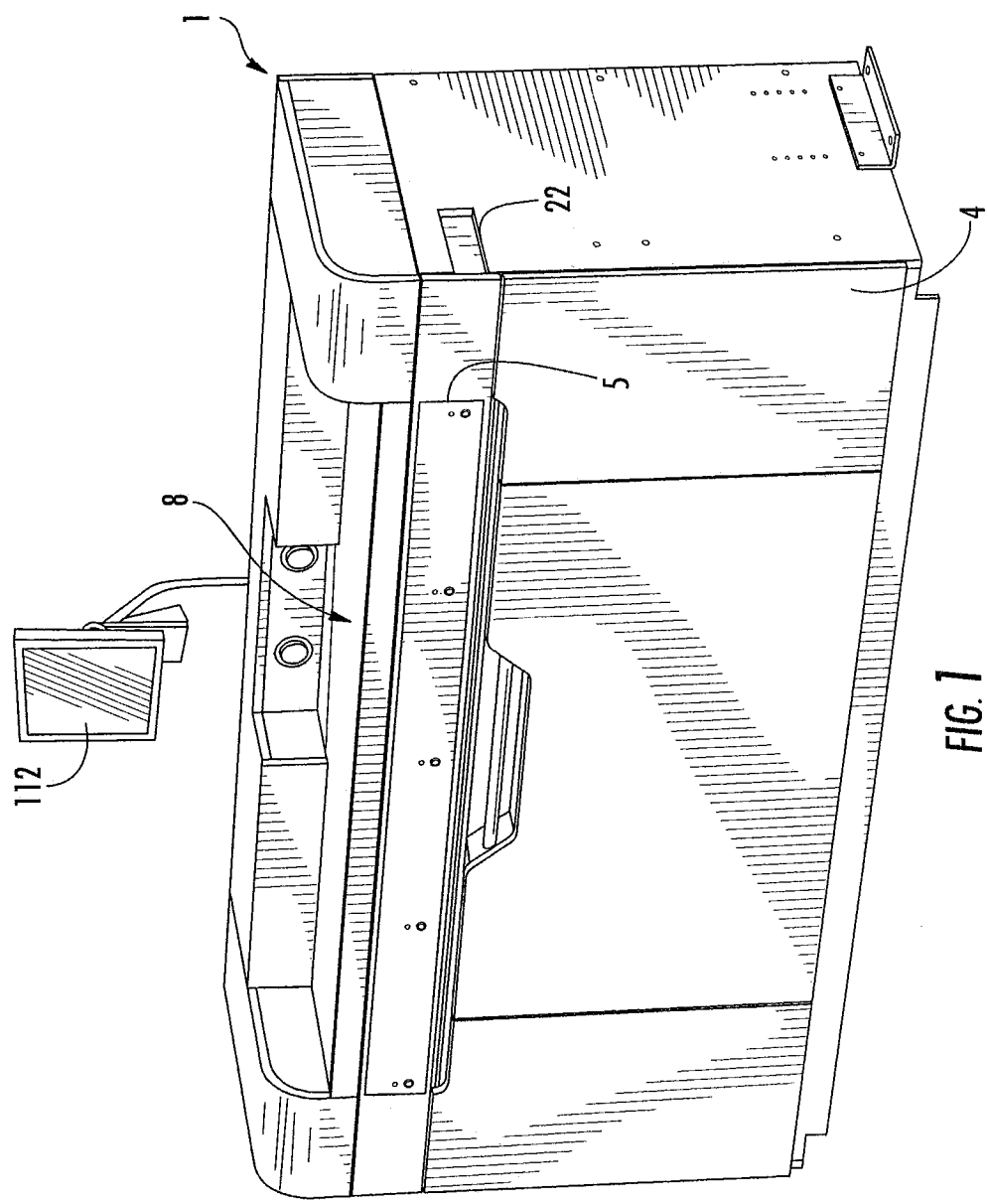
FIG. 1 is a perspective view of an embodiment of a SIS machine.
Figure 2:
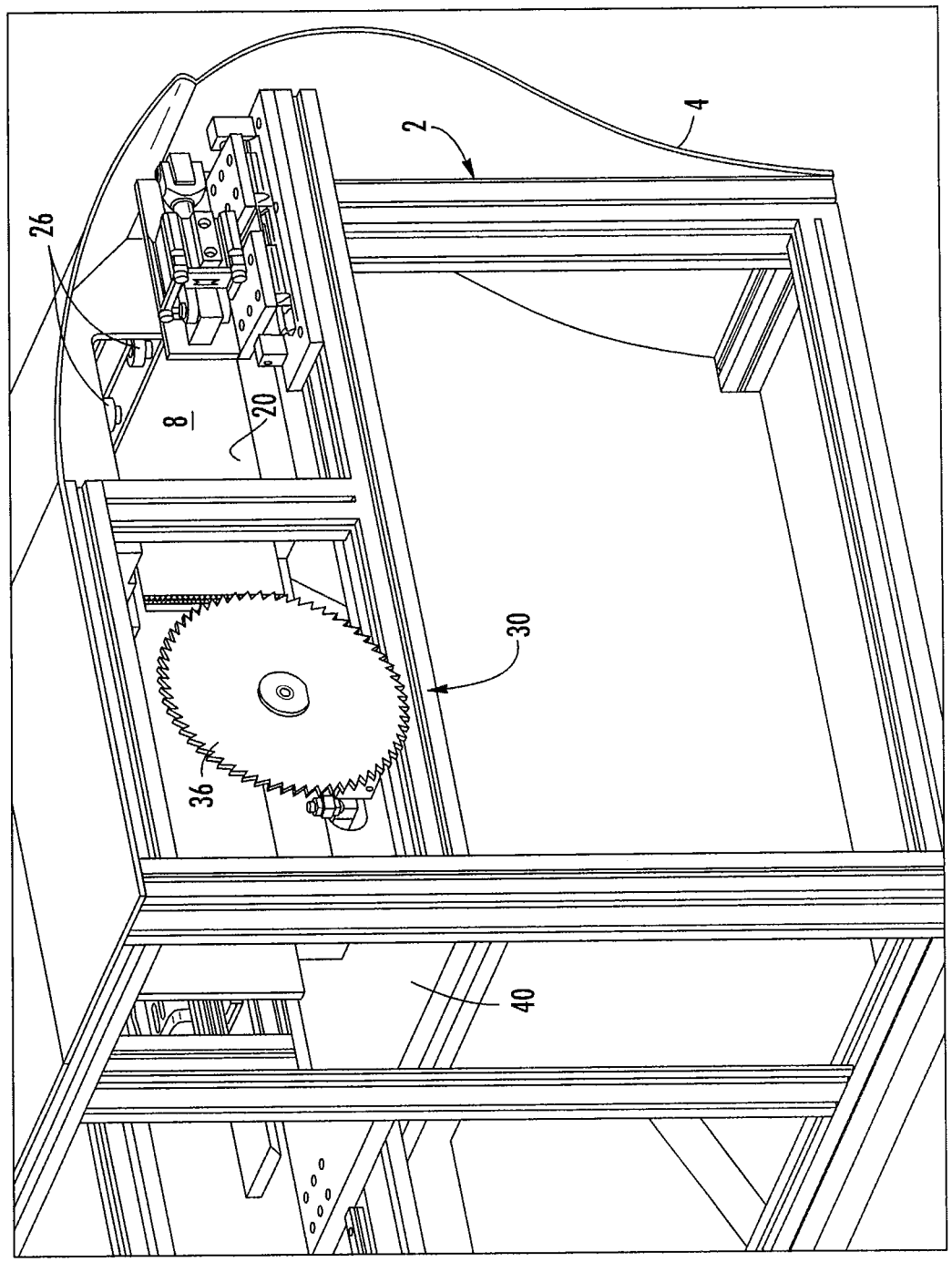
FIG. 2 is a perspective view showing an SIS machine with the outer housing removed to show a saw.
Figure 3:
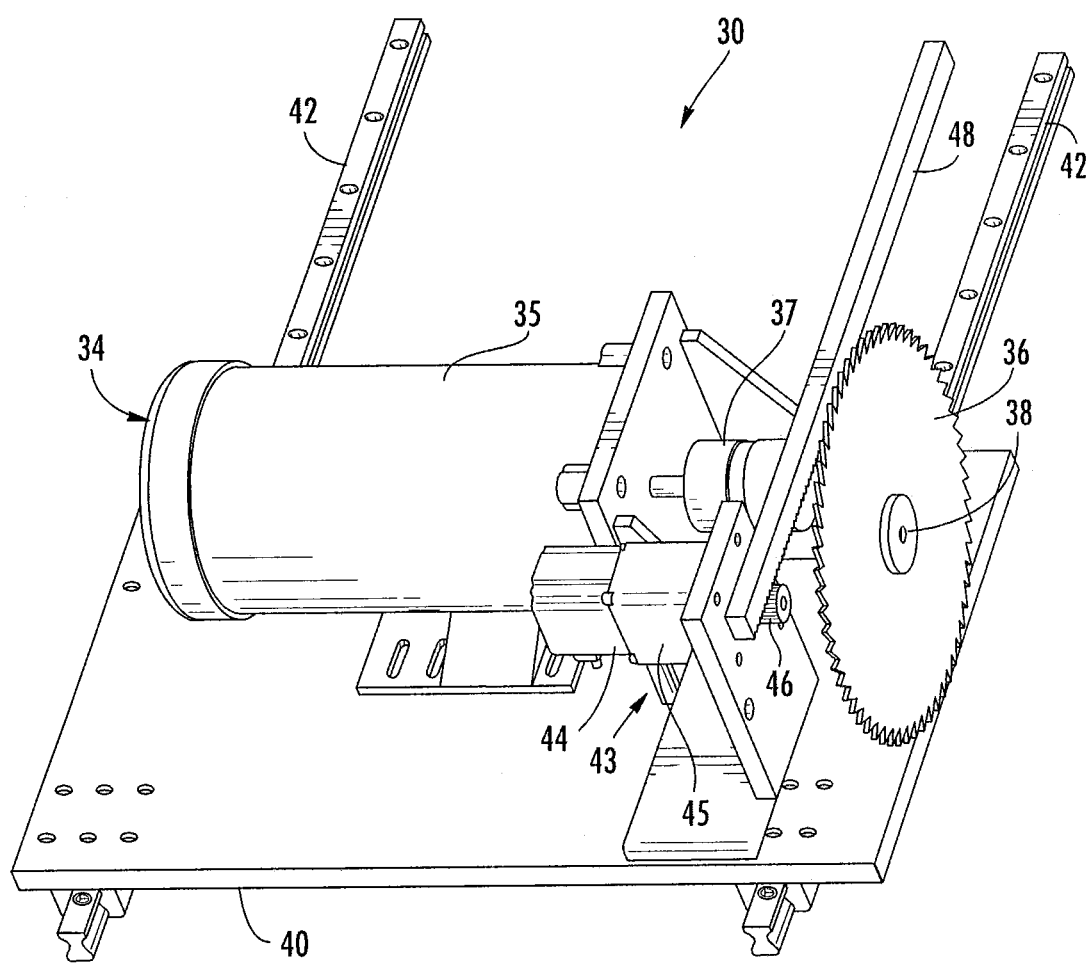
FIG. 3 is a perspective view of a saw used in the SIS machine.

FIGS. 1, 2, and 3 show one embodiment of a (SIS) machine 1. It is to be understood that the invention described herein may be used with any window cover cutting machine including automatic, semi-automatic and manual machines that use a saw to cut the window covering. One such cutting machine is disclosed in copending U.S. application Ser. No. 12/164,839, filed on Jun. 30, 2008 which is incorporated herein by reference in its entirety. In the illustrated embodiment an internal frame 2 supports the cutting, measuring and operating systems of the SIS machine. An outer housing 4 is provided to cover the internal mechanisms of the SIS machine. An opening 5 is provided to allow access to the interior cutting chamber 8 of the apparatus to allow a user to place a window covering 200 into and remove the window covering from the SIS machine. In the illustrated embodiment opening 5 comprises a drawer that may be form the illustrated closed position to an open position for receiving a window covering. The window covering may cut while in the package or while removed from the package where element 200 encompasses both situations.

A platform 20 is provided in cutting chamber 8 adjacent to opening 5 to support the window covering during the cutting operation such that a user can place a window covering 6 on the platform 20 through opening 5. The platform 20 comprises a substantially flat surface that is dimensioned to be able to receive and support a wide range of window covering sizes.

In one embodiment, a separate access opening 22 is provided on one side wall 24 of housing 4 such that a blind may extend through access opening 22 into cutting chamber 8 from outside of the SIS machine. Opening 22 is useful for window coverings that are longer than the length of the SIS machine.

Referring to FIGS. 2 and 3, a saw 30 may be located at one or both ends of platform 20 for cutting the window covering to the desired size. The saw 30 comprises a controllable variable speed drive 34 for rotating the arbor 38 on which the saw blade 36 is mounted. The variable speed drive 34 is controlled by the processor 102. The variable speed drive 34 may use a variable speed motor 35. Alternatively, motor 35 may be a single speed motor coupled to the arbor 38 with a variable speed transmission 37. Any other suitable arrangement that can control the rotational speed of the blade 36 may be used. In one preferred embodiment saw blade 36 comprises a 10 inch, 52 tooth steel-cutting blade. One suitable blade is sold by LENOX® as part number 21886ST100052CT.

Figure 4:
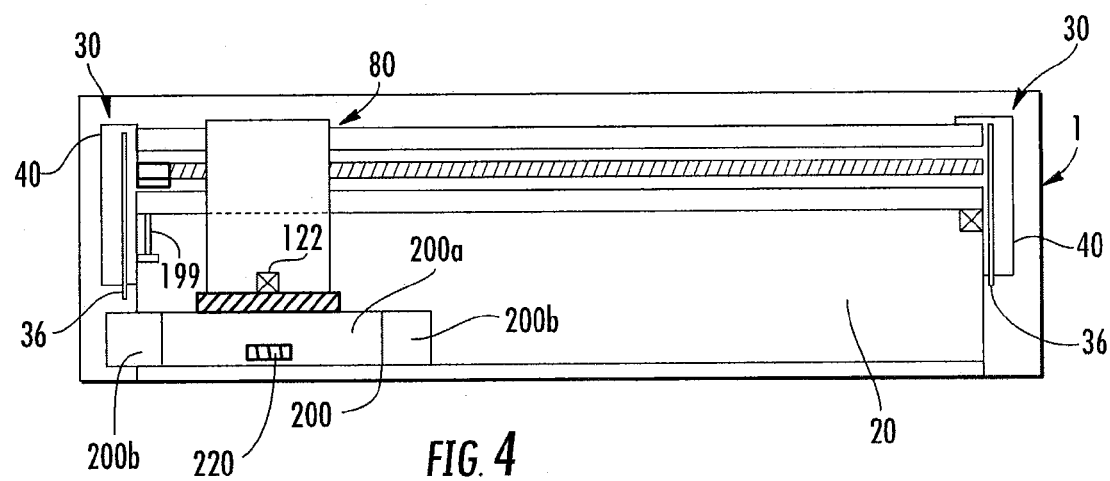
FIGS. 4 and 5 are schematic top views showing operation of a saw to cut a window covering.
Figure 5:
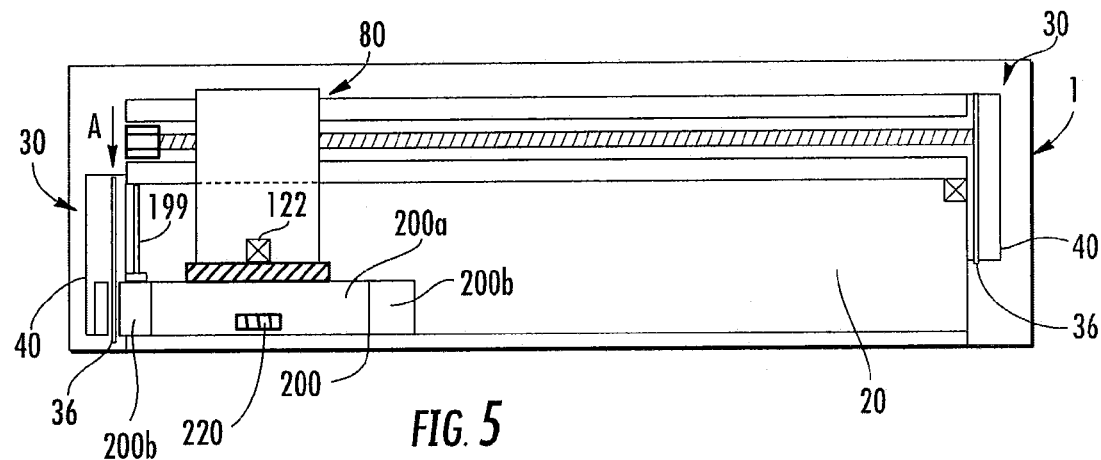

The motor 34, transmission 32, arbor 38 and blade 36 are mounted on a movable carriage 40 that is in turn supported on rails 42. The rails 42 support carriage 40 such that carriage 40 can reciprocate transversely relative to the platform 20 to bring the saw 30 from a retracted position, as shown in FIG. 4, to an extended position, as shown in FIG. 5. As the saw blade 36 is moved from the retracted position to the extended position it contacts and cuts through window covering 200. Carriage 40 moves saw blade 36 linearly in the direction of arrow A through the window covering 200 to cut the window covering. FIGS. 4 and 5 show a system where the window covering 200 is positioned in front of a saw 30 and held in position by a reciprocating clamp assembly 80. A separate stationary clamp 199 may be used to hold the end of the window covering 200 during the cutting operation. FIGS. 4 and 5 also show two saws 30, positioned at each end of platform 20 to cut opposite ends of the window covering 200. Alternatively, one saw may be used where the orientation of window covering relative to the saw is reversed.

Referring to FIG. 3, to move platform 40, a controllable variable speed drive 43 is provided that is controlled by computing platform 100. Drive 43 may comprise a motor 44 that is supported on the platform 40 and that rotates a pinion 46 that engages a rack 48 mounted on frame 2. When the motor 44 is actuated, the pinion 46 is rotated and through its engagement with the rack 48 reciprocates platform 40 on rails 42 toward and away from the window covering. The variable speed drive 43 may comprise a variable speed motor 44. Alternatively, motor 44 may be a single speed motor coupled to the pinion 46 by a variable speed transmission 45. Any other suitable arrangement that can control the linear rate of travel of the blade 36 may be used.

Figure 6:
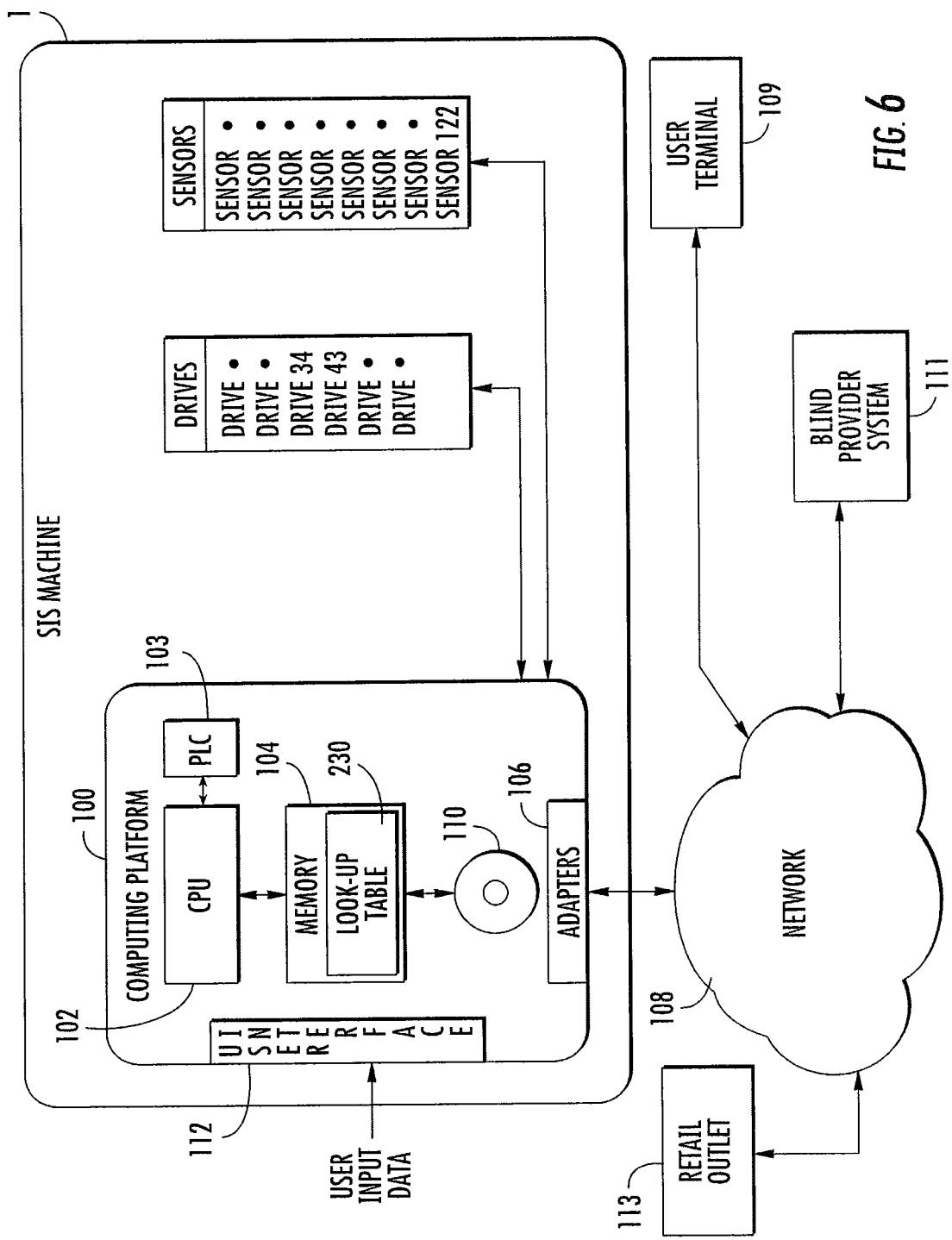
FIG. 6 is a block diagram of the operating system of the SIS machine.
Figure 7:
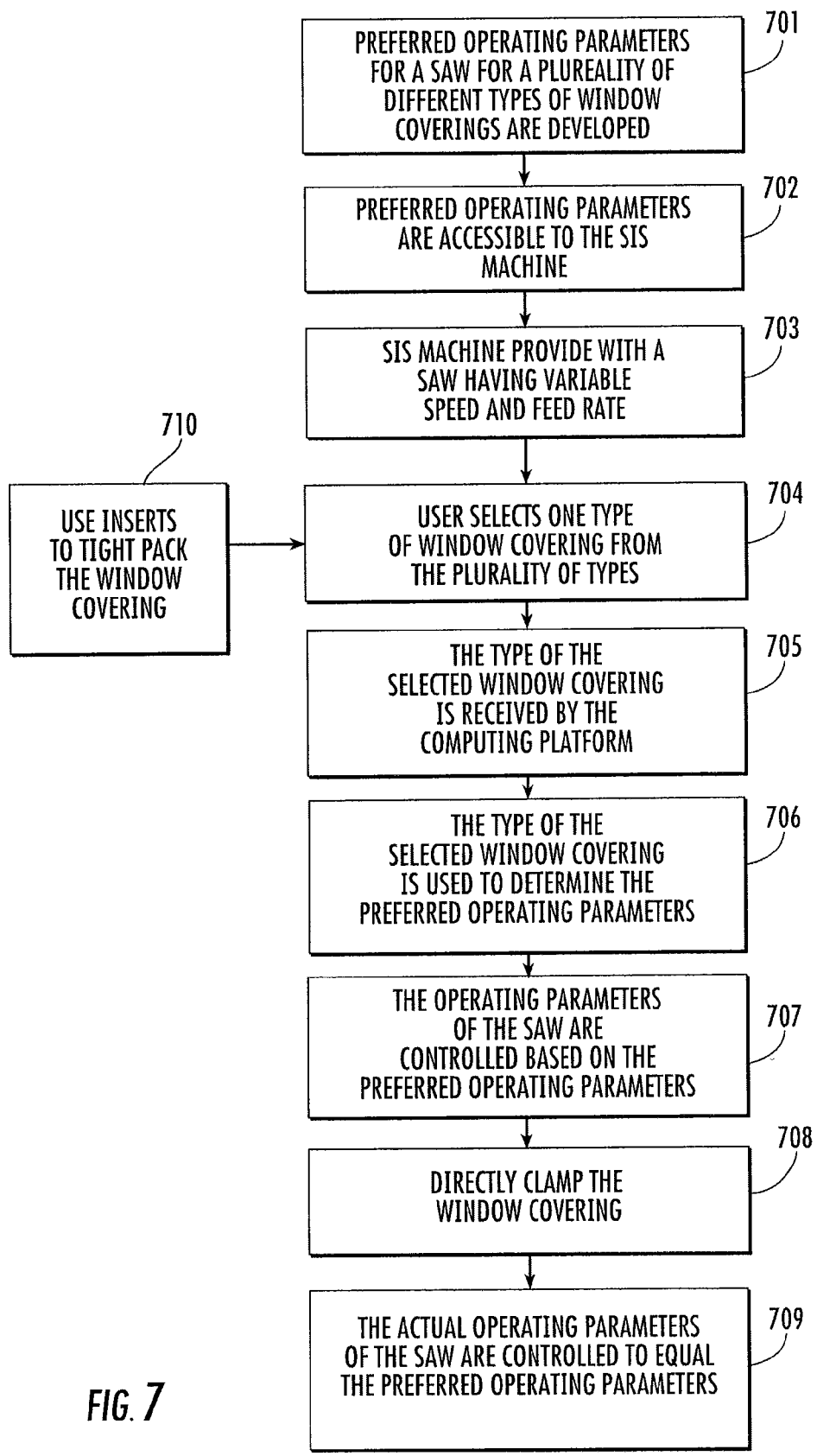
FIG. 7 is a block diagram illustrating a method of operating an SIS machine.

Referring to FIG. 6, one embodiment of the operating system of the SIS machine 1 includes a computing platform 100. The platform is controlled by a processor 102 which serves as the central processing unit (CPU) for the platform. Separate PLC controllers 103 may be used with processor 102 to control the drives of the SIS machine. Memory 104 is typically divided into multiple types of memory or memory areas such as read-only memory (ROM), and random access memory (RAM). A plurality of general-purpose adapters, 106 may be provided. At least one, in this example, serves to connect the computing platform to a network 108. The network 108 may be a corporate intranet, a local area network (LAN), the public switched telephone network, a wireless network, the internet or a combination of such networks. Computer program code instructions for implementing the appropriate applications and controlling the SIS machine are stored on the fixed medium 110. When the system is operating, the instructions are partially loaded into memory 104 and executed by the CPU 102. Numerous types of general purpose computer systems and workstations are available and can be used to implement computing platform 100. In other embodiments, however, a common database may be stored on a database server such as an SQL server. Available systems include those that run operating systems such as Windows™ by Microsoft, various versions of UNIX™, various versions of Linux™, and various versions of Apple's Mac™ OS. A user interface 112 such as a touch screen, keyboard and monitor, audio speakers or the like is provided to receive input from the user and to display output to the user. Other user interface devices may be used such as voice recognition, wireless communication technology, joy sticks, thumbwheels or the like. User interface 112 is intended to include any apparatus that allows the user to input data to the system and/or that allows the system to display information to the user.

A computer program which implements parts of the invention through the use of a system like that illustrated in FIG. 6 can take the form of a computer program residing on a computer usable or computer readable tangible storage medium such as a diskette. A computer program product containing the program of instructions can be supplied in such a form, and loaded on the machines involved, either directly, or over a network 108. The medium may also be a stream of information being retrieved when the computer program product is "downloaded" through the network 108. The computer-usable or computer-readable medium may be, for example but not limited to, an electronic, magnetic, optical, electromagnetic, infrared, or semiconductor system, apparatus, device, or propagation medium. Other examples of a tangible computer-readable medium would include a portable computer diskette or portable fixed disk, an optical fiber, a compact disc read-only memory (CD-ROM), and a digital versatile disc read-only memory (DVD-ROM).

Because the SIS machine uses a saw as the cutting device, the SIS machine may be used to cut window coverings either in or out of the packaging. Further, because the SIS machine uses controllable variable speed drives 34, 43, the SIS machine may cut a wide variety of types of window coverings including, but not limited to, wood, plastic, fabric, vinyl and aluminum and a variety of styles including, but not limited to, horizontal blinds, vertical blinds, woven shades, pleated shades, Roman shades and cellular blinds. Saw 30 can also cut the shade panel and the head rail and bottom rail in one cut. The rotational speed of the saws and the feed rate of the saws can be controlled on a per cut basis based on the type of window covering loaded in the SIS machine to provide a high quality cut.

Because the computing platform 100 is connected over network 108 to the blind manufacturer 111, service provider 109 and/or retail outlet 113, information may be remotely transmitted between these entities and the SIS machine. The software running the SIS machine can be remotely updated to change the operating parameters of the SIS machine including the operating parameters of the saw such as blade feed rate and blade speed.

Referring to FIGS. 4 and 5, a bar code 220 may be associated with or fixed to the package containing the window covering or directly to the window covering (if removed from the package) 200. The bar code may also be provided on a separate flip card. The bar code 220 is in a machine readable form that is readable by a sensor 122 such as an optical scanner. The bar code 220 identifies the specific type of window covering using a unique code. In one embodiment, the code from bar code 220 is used by the processor 102 to obtain from a look-up table 230 stored in memory 104, or retrieved from a remote data base, the detailed product identification information for the window covering. The bar code 220 may be replaced by radio frequency identification (RFID) tags or other suitable identification technology. The user may also input a code or blind type manually using interface 112.

The computing platform 100 uses the obtained product identification information to control the operating parameters of the SIS machine. The applicants of the present invention have determined that the saw operating parameters, feed rate and speed, can be changed for different window covering types to produce the high quality cuts. Other saw operating parameters may also be controlled to control cut quality. A quality cut should minimize: the number of defects per linear inch of drop; burning that results in the discoloration of slat and bottom rail ends due to excessive heat; chipping that results in the tearing off of fragments of finished wood surfaces; and splintering that results in fractures along the length of the slats. The applicants have discovered that these effects can be minimized by controlling the saw operating parameters blade feed rate and blade speed. The "speed" of the saw blade is defined as the rotational speed of the rotating blade and the "feed rate" of the blade is the linear speed at which the saw blade is moved through the window covering being cut. The optimal predetermined blade speed and blade feed rates for various types of window coverings has been discovered as set forth below:

| Window Covering Type | Feed Rate (inches per second) | Speed (rotations per minute) |
| --- | --- | --- |
| Real Wood | 0.2 | 4500 |
| Faux Wood | 0.68 | 4500 |
| Cordless Cellular | 0.68 | 4500 |
| Vinyl | 0.68 | 2500 |
| Aluminum | 0.68 | 2500 |
| Woven Wood | 0.2 | 4500 |
| Vertical Head Rail | 0.68 | 2500 |
| Vertical Vane | 0.2 | 4500 |

Because the type of window covering is obtained by the computing platform from the bar code 220, manually via interface 112 or otherwise, the processor 102 may refer to the look-up table 230 to determine the predetermined preferred feed rate and speed for the selected type of window covering. Based on this information, the computing platform 100 controls the drives 34 and 43 to control the speed of the blade and the feed rate of the blade through the window covering. A default speed and feed rate may also be provided for types not otherwise listed.

Because the drives 34 and 43 are controlled by processor 102, the preferred speeds and feed rates may be updated. The speeds and feed rates may be changed based on changes in materials, window covering designs or the like or to add new window covering types. Moreover, because the computing platform 100 may be connected to a manufacturer or service provider over network 108 these changes may be remotely downloaded to the computing platform 100.

The speeds and/or feed rates may also be varied for different components of the same window covering. For example, the saw 30 may be operated at a first feed rate and/or speed when cutting a steel head rail on a window covering and a second feed rate and/or speed when cutting the wood slats on the same window covering. Using the look-up table 230 the variable drives 34 and 43 may be controlled to change these operating parameters during a single cutting feed. The change may be based on elapsed time or distance traveled. For example, the feed rate or speed may be changed after a predetermined period of time has elapsed from the initiation of the cut or after the carriage 40 has moved a predetermined distance. Both the elapsed time and the distance traveled may be related to the location of the saw blade 36 relative to the window covering. For example, the distance traveled or elapsed time can be related to the position of the saw when it cuts through the head rail such that after the predetermined time elapses or the predetermined distance is traveled the head rail is presumed cut. The drives 34 and 43 are then controlled to change the operating parameters of the saw prior to cutting the remainder of the window covering.

Figure 8:
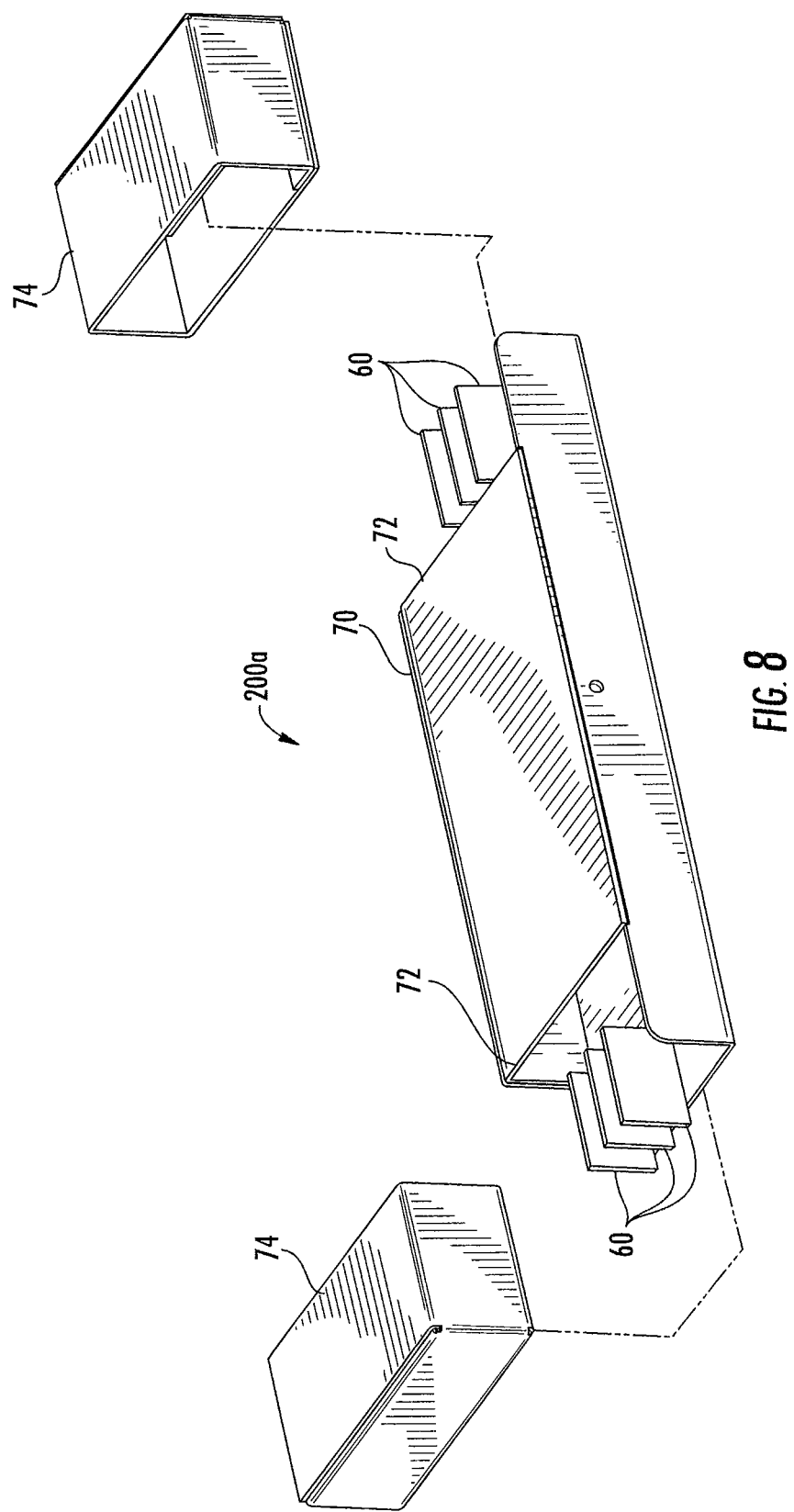
FIG. 8 is a perspective view showing a package usable with the SIS machine of FIG. 1.
Figure 9:
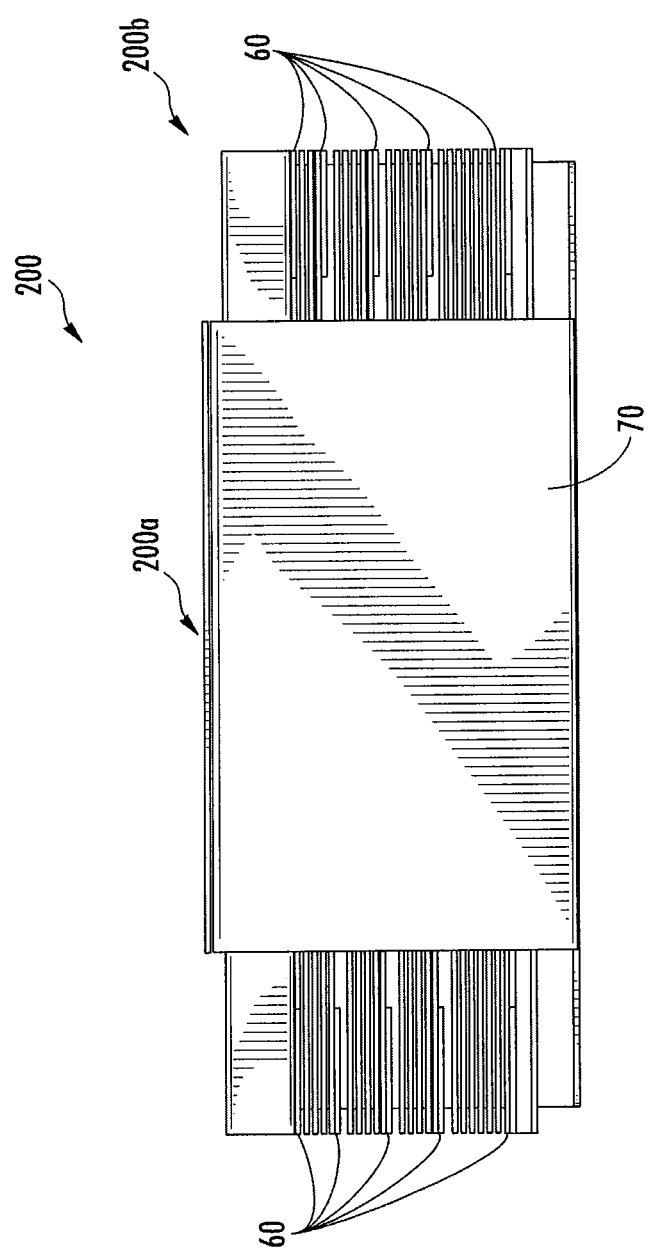
FIG. 9 is a top view showing the package of FIG. 8 packed with a window covering.

Another factor that has been determined to affect cut quality is the ability of the machine to tight pack the window covering components against one another during the cutting operation. One embodiment of a suitable package is shown in FIGS. 8 and 9. Package 200a consists of an open-ended box or sleeve 70 that is a rectangular container that is open at both ends 72. The window covering 200b is oriented in box 70 such that it is centered in the box. The head rail, slats and bottom rail extending along the long axis of the box 70 and the ends of the window covering extend beyond the open ends 72 of the box 70 and are exposed.

For transport, storage and display purposes end caps 74 cover the open ends of the box 70. The end caps 74 may be secured to the box 70 by any releasable connection including a shrink wrap, adhesive, tear-away tabs or the like. The end caps 74 are removed from box 70 prior to cutting and may be replaced on the box 70 after the cutting operation to retain the cut window covering 200b in box 70.

With the package described above the window covering components are exposed such that clamp 199 applies the clamping force directly to the head rail (or other window covering component), rather than on the package containing the window covering. As a result, the clamping force compresses the window covering components into tight engagement with one another creating a tight pack.

Another device to create a tight pack is the use of inserts shown in FIG. 9. Inserts 60 may be disposed between the window covering components where the inserts 60 allow the clamp to better compress the window covering components together. The inserts 60 comprise rectangular blocks of relatively stiff but moderately compressible material such as chip board. Chip board is pressed fiber thick paper, usually made from recycled paper. The inserts 60 fit between adjacent slats of the window covering. The inserts 60 are dimensioned to extend for approximately the depth of the slats and to extend from the end of the slats through the cut zone. In one embodiment the inserts 60 are approximately 4 inches wide and 1/16 of an inch thick. When the clamp 199 compresses the window covering, the inserts 60 are trapped and compressed between adjacent window covering components. It has been found that placing inserts 60 between the head rail 4 and top slat 2a, between the bottom rail 6 and the bottom slat 2b, and positioning three additional inserts 60 at equally spaced intervals along the slats provides the required tight pack. Inserts may also be placed between the bottom rail and box 70. It has also been determined that doubling the thickness of the insert between the head rail 4 and top slat is most effective. The tight pack may be created and the inserts inserted into the blind either during initial packaging of the window covering by the manufacturer or at the time of the cut by the SIS machine operator.

A method of cutting a window covering will be described. Preferred operating parameters, blade speed and blade feed rate, for a saw for a plurality of different types of window blinds are developed (Block 701). The preferred operating parameters are accessible to the SIS machine from a local data base or from a remote location such as a server. (Block 702). The SIS machine is also provided with at least one saw blade where the saw blade is controlled by a first controllable variable speed drive that controls feed rate and a second controllable variable speed drive that controls speed (Block 703). A user selects one type of window covering from the plurality of different types of window coverings (Block 704). The type of the selected window covering is received by the computing platform using bar code 220, manual interface 112 or by some other means and is identified (Block 705). The type of window covering is used by the processor 102 to determine the preferred operating parameters, one or both of a blade feed rate and a blade speed, for the type of window covering from the stored preferred parameters (Block 706). The computing platform 100 controls the first controllable variable speed drive and/or the second controllable variable speed drive to control one or both of the blade speed or the blade feed rate based on the preferred operating parameters (Block 707). Clamp 199 may be extended to clamp the package or to directly clamp the window covering to create a tight pack (Block 708). The first drive and second drive are controlled such that the actual speed of the saw blade and/or the actual feed rate of the saw blade equal the preferred speed and/or the preferred feed rate for the selected type of window covering and the window covering is cut at the preferred parameters (Block 709). It will be understood that although the preferred speed and preferred feed rate are defined with specificity the actual speed and feed rate are considered to be equal to the preferred speed and feed rate if the actual and preferred values are within a the operating margin of error of the system. The window covering components may be in a tight pack where the window covering elements are packaged in a box with open ends such that they may be directly clamped and inserts are inserted between selected components (Block 710).

Specific embodiments of an invention are described herein. One of ordinary skill in the art will recognize that the invention has other applications in other environments. In fact, many embodiments and implementations are possible. The following claims are in no way intended to limit the scope of the invention to the specific embodiments described above.

The invention claimed is:

1. An apparatus for cutting a window covering comprising:
 a saw blade for cutting a plurality of different types of window coverings;
 a first variable drive for moving the saw blade into engagement with a window covering selected from the plurality of different types of window coverings;
 a second variable drive for rotating the saw blade;
 a storage medium for storing a preferred saw blade feed rate and a preferred saw blade speed for each of the plurality of different types of window coverings; and
 a processor for controlling the first variable drive and the second variable drive based on the preferred saw blade feed rate and the preferred saw blade speed for a particular window covering positioned at the apparatus, wherein the processor is configured to increase a saw blade feed rate or a saw blade speed either (i) after the saw blade has traveled a predetermined distance during a cutting operation, or (ii) after the saw blade has operated for a predetermined length of time during a cutting operation.

2. The apparatus of claim 1 wherein the first variable drive comprises a first variable speed motor.

3. The apparatus of claim 1 wherein the second variable drive comprises a second variable speed motor.

4. The apparatus of claim 1 wherein the saw blade comprises a 10 inch, 52 tooth steel-cutting blade.

5. The apparatus of claim 1 wherein the first variable drive moves a carriage, said carriage supporting the second variable drive.

6. The apparatus of claim 1 further comprising a second saw blade spaced from the saw blade.

7. The apparatus of claim 1 wherein the processor is connected to a network.

8. The apparatus of claim 1 further comprising a sensor for reading a machine readable code secured to a package containing the window covering.

9. The apparatus of claim 6 further comprising a platform in a cutting chamber where the saw blade and second saw blade are at opposite ends of the platform.

10. The apparatus of claim 1 wherein the second variable drive comprises a variable speed transmission.

11. The apparatus of claim 1 wherein the first variable drive comprises a rack and pinion.

12. The apparatus of claim 9 wherein platform supports the window covering adjacent the saw blade and the second saw blade.

13. The apparatus of claim 8 wherein the sensor comprises an optical scanner.

14. The apparatus of claim 1 wherein the storage medium stores at least one of a default saw blade feed rate and a default saw blade speed.

* * * * *